May 11, 1965   H. L. HAMANN ETAL   3,182,367
FASTENER
Filed Dec. 11, 1961
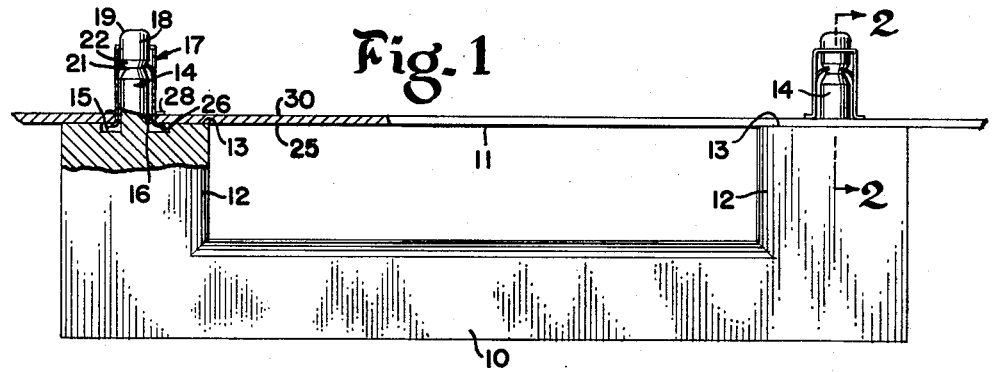
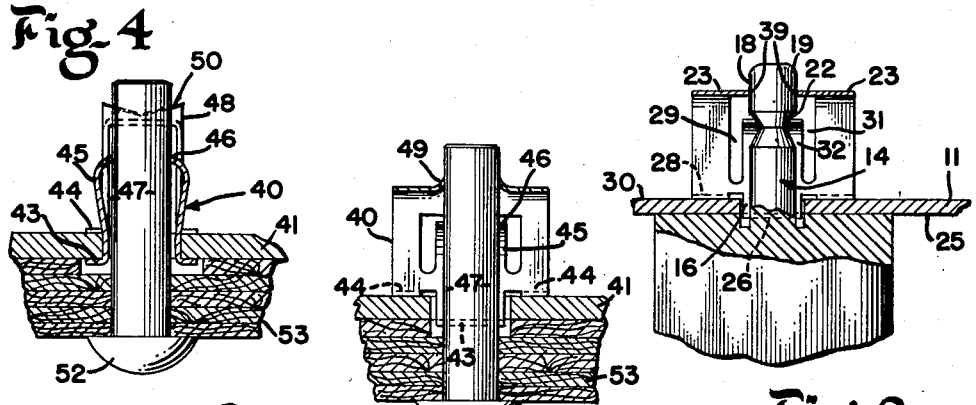
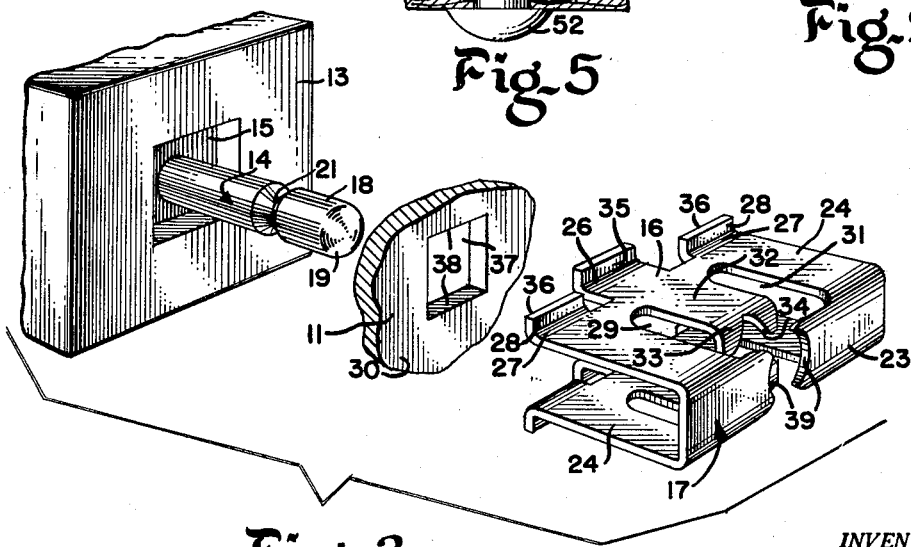
INVENTOR.
HARRY L. HAMANN
HARRY F. SILSTORF
BY
ATTORNEYS

United States Patent Office 3,182,367
Patented May 11, 1965

3,182,367
FASTENER
Harry L. Hamann, Toledo, Ohio, and Harry F. Silstorf, Petersburg, Mich., assignors, by mesne assignments, to The Bishop and Babcock Corporation, Toledo, Ohio, a corporation of Ohio
Filed Dec. 11, 1961, Ser. No. 158,311
5 Claims. (Cl. 24—73)

This invention relates to fastening devices and more particularly to clips for retaining studs in panel apertures through which they pass.

Frequently it is necessary to secure hardware, name plates or trim elements to panel surfaces under circumstances where only the outer face of the panel is accessible. For example, it is inconvenient to mount elements which will protrude from a panel face in the early stages of many manufacturing operations inasmuch as such protrusions interfere with the normal handling and processing of the panel element. Thus a refrigerator door may best be assembled with its insulation and lining material prior to the time name plates, trim and handles are applied. In many instances valuable shipping space can be saved by avoiding the application of handles to such doors until the appliance is received by the retailer or even delivered to the ultimate purchaser.

Heretofore a number of techniques have been available for mounting such elements upon panels. Each of these techniques had drawbacks which make it less than completely satisfactory. For example, the elements have been mounted with sheet metal screws. However, such mountings entail an application by rotating the shank of the screw which is inconvenient, occasionally results in damage to the panel or element through tool slippage, results in an exposed screw head which may be detrimental to the aesthetic appeal of the unit, and produces a fastening which is not sufficiently rugged for certain applications such as the mounting of handles.

Another alternative has involved the utilization of a caged nut. This entails the provisions of a cage on the rear face of the panel to contain the nut and the preparation of this fastening prior to the assembly of the panel. The machine screw which is engaged by the nut is subject to many of the same deficiencies enumerated above with respect to sheet metal screws. Other forms of fastenings include resilient shanks which are biased outwardly to engage the walls of an aperture in the panel and are secured to the element to be mounted in a location which substantially obscures the fastening. Frequently the problem of securing such a fastening to the element results in a connection which is not sufficiently rugged for mounting handles and the like. Further provisions are required in the structure of the element to accommodate the fastening which are expensive and/or which detract from the appearance of the mounted element.

The present invention has for its object the elimination of the above noted deficiencies in fastening devices for studs such as might be employed for trim elements, name plates and hardware.

Another object is to facilitates the blind mounting of elements having studs protruding from the faces thereof which bear upon a supporting panel.

A further object is to improve stud clips particularly stud clips adapted for blind mounting.

Additional objects are to provide an inexpensive stud clip which is sufficiently rugged to retain studs or stud mounted elements such as door handles on a door panel, to stabilize and support studs in a position generally normal to a panel, to resiliently draw studs through an aperture in a panel whereby the element of which the stud is a part is drawn against the face of the panel, to enable stud-bearing elements to be secured in a panel by a simple linear thrust of the element against the panel, and to completely conceal the mounting means for stud-bearing elements in a blind mounting application.

In accordance with the above objects one embodiment of this invention comprises a stud clip of resilient sheet material formed in a trough shape. The trough sides are resiliently biased outwardly of each other and are joined by a trough bottom which is partially cut away to pass a portion of the end of a stud. The cutaway portions of the bottom are arranged to bear against the sides of the stud on opposed portions thereof which are aligned with the longitudinal axis of the trough. Portions of the trough sides are cutaway to define stud-engaging fingers which are turned inwardly to engage their ends with the stud sides in a region in quadrature to that upon which support is provided by the bearing surfaces on the trough bottom. Outwardly bent mounting tabs are provided on the upper edges of each of the trough sides arranged so that those tabs can be admitted through an aperture in a panel from the rear face of that panel and will spring outward to engage the aperture walls and provide overhanging flanges on the outer panel face. Shoulder forming tabs also formed on the upper edges of the trough sides at a position displaced toward the trough bottom a distance sufficient to define a panel thickness between the lower face of the mounting tab and their upper face. Thus the panel is contained between the mounting tabs and the shoulder tabs.

The stud cooperating with this clip has an undercut region positioned along its length from its base a distance such that the region registers with the inturned ends of the locking fingers of the clip. The wall of the undercut region most remote from the element supporting the stud is formed with an inclined face so that the locking fingers, due to the mechanical bias causing them to converge, have a camming action on the inclined face tending to draw the stud completely through the panel aperture, thereby drawing the bearing face to which the stud is secured against the outer face of the panel. The inclination of the camming surface in the undercut region is such that forces tending to withdraw the stud from the panel aperture cause the locking fingers to bite into the camming face without spreading those fingers.

When applied to handles having a pair of bearing surfaces and thus a pair of studs protruding from those surfaces the stud clips are arranged such that the longitudinal axis of the clip along the length of the trough is transverse of the axis defined between the paired studs. Thus sidewise pressure on the handle tending to rock the studs in their apertures is opposed by the support offered to the studs by the bearing faces of the bottom of the fastener trough.

One advantageous feature of the stud clip construction described resides in the combination of a mounting tab and shoulder tabs both of which are formed in the same operation as with a single die. This design affords a high degree of accuracy in the critical spacing of the adjacent faces of the mounting and shoulder tabs to define the region which will contain the panel wall portions adjacent the aperture through which the mounting tabs are fitted. The close fit of these elements to snugly embrace the panel is a significant factor in achieving an effective stud clip which will not shake loose or be displaced during the assembly of the panel and will be retained in accurate position until the stud is inserted for mounting.

Another feature resides in the stud stabilizing and supporting structure wherein the sides of the clip have fingers biased radially inward on the stud and the bottom of the clip confines the stud against radial displacement in quadrature with the lock fingers. In certain embodiments the bottom of the clip can form resilient, stud engaging fingers which impose an inwardly directed radial bias on the stud and bite into the stud walls to impede its withdrawal.

The above and additional objects and features of this invention will be more fully appreciated from the following detailed description when read with reference to the accompanying drawing in which:

FIG. 1 is a side elevation of a panel-mounted handle utilizing a pair of stud clips according to this invention, wherein the stud clips are illustrated from an end view, portions of the drawing being broken away and sectioned to more clearly reveal details of the construction;

FIG. 2 is an enlarged partially broken away side view of one supporting column for the handle of FIG. 1 showing the stud clip sectioned as along line 2—2 of FIG. 1;

FIG. 3 is an exploded view of the stud clip of FIG. 1, the portion of the panel upon which the clip is mounted in the region of the clip mounting aperture, a portion of the stud cooperating with the clip, and a portion of the element mounted by means of the stud;

FIG. 4 is a sectioned end view of another embodiment of the stud clip of this invention as applied to a rivet-like fastener; and FIG. 5 is a side elevation of the fastener of FIG. 4 taken along the centerline of the fastener.

As shown in FIG. 1 the invention is applied to a handle 10 supported from a panel 11, which may be, for example, the door of a refrigerator, by means of spaced columns 12 having bearing surfaces 13 which are drawn against the face of the panel 11. A stud 14 is rigidly secured to the column 12 to project normal from the bearing face 13 and advantageously as shown in FIG. 1 can be formed integral with the column 12. Adjacent the base of the stud and in the bearing surface 13 is a relieved region 15 arranged to accommodate the mounting tab 16 of the stud clip 17. Stud 14 has a head portion 18 which is tapered at 19 for purposes which will be described below. Beneath the head portion is an undercut region providing a circumferential groove 21. The groove is defined by an inclined face 22 adjacent head 18 which functions as a camming surface as will be described.

As best seen in FIG. 3 the fastener 17 is made of resilient, sheet-like material which may be spring metal formed into a general trough shape with a trough bottom 23 joining trough sides 24 which terminate at their central upper edges in mounting tabs 16 having turned-out portions 26 and shoulder tabs 27 having turned-out portions 28. Integral with the trough sides 24 and formed by cutout portions 29 and 31 are stud locking fingers 32 having ends 33 turned inward of the trough and towards each other terminating in stud engaging faces 34, opposite members of which are spaced apart less than the minimum transverse dimension of the stud as determined at the throat of the groove 21.

The panel 11 upon which the stud fastener is to be secured is formed of a predetermined gauge of metal. The thickness of this metal between its outer face 25 and inner face 30 is accommodated by the spacing between a plane defined by the uppermost face 35 of the turned-out portion 26 of mounting tab 16 and the lowermost face 36 of the turned-out portion 28 of shoulder tabs 27. Thus the fastener is mounted in a suitable aperture 37 in the panel 11 by compressing trough sides 24 toward each other until the limits of the out-turned portions 26 of mounting tabs 16 will pass between the walls 38 of the aperture 37 and by inserting the tabs 16 into the aperture 37 until the surfaces 35 are in the plane of outer surface 25 of the panel 11. The sides 24 are then permitted, by virtue of their inherent resilience, to spring apart thereby carrying tabs 16 to a position grasping the periphery of aperture 37 and the panel portions in its vicinity between surfaces 35 and 36.

In order to insure accurate spacing of the plane of surface 35 of the mounting tabs 16 from the plane of surfaces 36 of the shoulder tabs, the tabs are arranged to be formed in a single operation whereby the die employed accurately establishes that spacing. Fasteners of the type under consideration can be formed in a progressive stamping operation employing a progressive die. Indexing variations in the progression of the strip stock fed the die frequently introduce variations in dimensions of the finished product. Advantageously both mounting-shoulder tabs sets can be formed at a single stattion in the die to avoid variations, however, it is to be appreciated that each set might be made at a different station if desired without losing the benefits of the die established dimensions. Thus the tabs of a set are all formed out of the surface of the stock in the same direction so that the shoulder tabs extend outwardly from the trough as do the mounting tabs.

Inasmuch as the stud clip 17 is mounted on the rear face of panel 11 before that panel is assembled and the stud is applied through the clip and aperture 37 only after the panel has been completely assembled as in the fabrication of a door including insulation and a liner, the stud clip is inaccessible to further manipulation with respect to its mounting after the preliminary assembly of the panel. Accordingly the stud clip must be accurately maintained in the aperture. This is accomplished by means of the precise spacing of the surfaces 35 and 36 to match the thickness of the metal making up the panel 11.

Once the clip 17 is mounted in aperture 37 of panel 11, the only portion of the clip exposed to the front face 25 of the panel is the offset portion 26 of mounting tab 16 as best seen in FIG. 1. The stud-bearing element to be mounted on the panel 11 is then secured to the panel by inserting the stud in the aperture 37 and advancing it along its longitudinal axis into that aperture. For this purpose the aperture 37 is formed with dimensions along the length of its sides 38 at least equal to the maximum dimension of that portion of the stud 14 which passes through the aperture and the separation of the edges 38 is at least equal to the maximum dimension of the stud 14 which passes between those surfaces plus twice the thickness of the material of tab 16.

As the stud 14 is advanced into the aperture it passes between the stud-gripping fingers 32 and its tapered end 19 engages the bearing surfaces 34 and separates those fingers by springing the fingers outward. As the stud is advanced axially the end 19 and the side walls of its head 18 enter the cutout portion of trough bottom 23, passing between the opposed portions of that bottom so that the surfaces 39 each bear on portions of the side wall of head 18 in regions which are in quadrature with the regions upon which the confining forces are imposed by the bearing surfaces 34. The bearing surfaces 39 thus impart stability to the stud 14 so that it cannot be rocked in the plane of the longitudinal axis of the stud clip 17. This stability is of particular advantage when applied in applications such as that illustrated in FIG. 1, where two or more studs are located in alignment. Since the apertures 37 in panel 11 can be formed with their major dimensions parallel with the line between aligned stud receiving apertures so that the longitudinal dimension of the stud clip is transverse of the line between those apertures and the supporting effect of bearing surfaces 39 prevents displacement of the handle transverse of the plane normal to the panel 11 and passing through the aligned studs. In this manner the clips impart stability in that plane and the handle is held rigidly in position.

The final mounting of the stud in stud clip 17 is accomplished by advancing the stud head 18 beyond the contact surfaces 34 of stud locking fingers 32, whereby the resilience of those fingers tends to force those surfaces 34 toward each other and over the inclined face of the cam surface 22 to impart a force tending to advance the stud through aperture 37 and to draw bearing surface 13 against the outer face 25 of panel 11. This camming action is particularly significant where elements are applied to large areas such as sheet metal door panels which are sufficiently flexible to buckle when any substantial pressure is imposed during the axial advance of the stud since such yielding prevents the driving of the stud home. It will be noted that the clip dimensions are critically related to the stud dimensions in that the separation of the trough bottom 23 from the surface 35 is greater than the separation of the groove 21 on stud 14 from the bearing surface 13 and less than the separation of the tapered portion 19 from the surface 13, so that the bearing faces 39 are assured of engaging a side wall portion of the stud head 18. Further the separation of the locking finger bearing surfaces 34 from the surface 35 is greater than the separation of the throat of groove 21 from the surface 13 and less than the outer limit of surface 22 from the surface 13. This insures that the fingers will engage the inclined surface 22 to provide the camming action drawing the bearing surface 13 up against the face 25 of panel 11. Further the dimensions of the aperture 37 along the length of side 38 and between the side 38 of that aperture are proportioned so that the shank of stud 14 is closely contained thereby insuring stability.

It is desirable that the spring finger bearing surfaces 34 slide freely over the inclined face 22 in performing the camming action and that forces tending to withdraw the stud do not cam the fingers apart. The camming action is enhanced if the face 22 is relatively hard. This can be realized by any of a number of techniques but is particularly conveniently accomplished with chrome plated parts since the plating hardens the surface. In practice one particularly satisfactory combination of dimensions applied to a round stud of ¼ inch diameter included turning the spring fingers 32 inward on a ¼ inch radius to a position essentially normal to the sides 24 and utilizing a groove 21 on the stud which is 0.040 inch deep at its throat and has a 62° inclination to a line from the throat to the head of the stud parallel to the stud axis. In order that the spring finger clears the underlying portion of the stud that portion is chamfered at 38°.

The stud fastener of this invention is also applicable, in modified form, to the fastening of studs on stiff members which do not yield when the stud is thrust toward them. In such instances the camming action of surface 34 on wall 22 can be eliminated and other means can be provided for opposing the forces tending to withdraw the stud. FIGS. 4 and 5 illustrate a utilization of clip 40 with a rigid support such as a flange 41 of a channel. The clip is secured to the flange by mounting and shoulder tabs 43 and 44 in the same manner as clip 17. It is provided with locking fingers 45 formed from the trough sides in the fashion of fingers 32 so that the V-shaped notches in the ends of the fingers provide bearing surfaces 46 turned inward to engage the shank of the stud 47. The bottom 48 of the troughs has been modified to form a stud clamping combination for engagement of the stud in quadrature with the fingers 45 which is composed of opposed resilient cantilever extensions 49 bent outwardly from the bottom which terminate in V-notches and have paired bearing surfaces 50 to engage the stud.

In the embodiment of FIGS. 4 and 5 a stud having a smooth right circular cylindrical form without any notches is employed. One advantageous form of stud is a rivet composed of relatively soft metal so that the bearing surfaces 46 and 50 on locking fingers 45 and extensions 49 will bite into the shank to function as barbs and prevent its release. The illustrated application utilizes a soft iron rivet having a large head 52 to secure a plywood panel 53 to a flange 41. In applying the rivets as a fastener the rigidity of the panel 53 and flange 41 permits the rivet to be driven home by application of a sharp blow on the rivet head. The resultant advance of the shank along the bearing surfaces is maintained without loosening since the bearing surfaces bite into the shank as it tends to withdraw in the direction of the head.

While the stud and stud clip combination disclosed herein offers particular advantages when utilized in paired intallations for handle mounting it is to be appreciated that such clips and such stud mountings might be used singly or in multiple combinations other than those illustrated. Further the clip and stud construction can be modified without departing from the spirit and scope of this invention. For example, the stud need not be a generally right circular cylinder and can be tapered along its length or be rectangular in shape. The bearing surfaces engaging the side walls of the stud can be modified from those illustrated to either conform over a broader area to the stud surface or to contact the stud at essentially point contacts. The orientation of the mounting and shoulder tabs can be varied as by the elimination of one of the two shoulder tabs on each trough side. In view of these possible modifications in form it is to be appreciated that the above description is to be read as illustrative of the invention and not in a limiting sense.

Having described the invention, we claim:

1. A stud clip for panel mounting comprising a trough-shaped body of resilient sheet material; sides for said body spaced greater than the transverse dimension of the stud to be secured and of a height less than the length of the stud to be secured; means for blind mounting said clip comprising a mounting tab on each side having a portion formed generally perpendicular thereto to extend outwardly of the trough in a common plane and a shoulder tab on each side having a portion formed generally perpendicular thereto in a common plane spaced along said side from the plane of said mounting tabs such that the adjacent surfaces of the mounting and shoulder tabs are spaced the distance corresponding to the thickness of the panel; a stud-engaging finger integral with each trough side; a notched end on each finger turned inwardly of said trough, said respective ends being spaced less than the minimum transverse dimension of said stud and being formed whereby said ends each have spaced points of contact with said stud and are resiliently biased against an intervening stud; a trough bottom for said body joining said sides and having a cut out region in alignment with the stud receiving region between said mounting tabs and said stud engaging fingers; and bearing surfaces formed by the margins of said cut out regions, adapted to bear against the side walls of said intervening stud in a region longitudinally spaced along said stud from the region of said fingers, said surfaces generally conforming to said stud cross section over opposed portions of the margin of said cross section to contact said stud in regions overlapping the longitudinal projection along the stud of the points of contact between said stud and said fingers and support said stud in quadrature to the support of said fingers.

2. A stud clip for mounting in registry with an aperture in a wall comprising a pair of opposed sides, an intermediate region coupling said sides at one end, a mounting tab extending from each side at a second end adapted to be positioned adjacent said wall, a shoulder tab extending from each side in proximity to said second end, a portion of each of said mounting tabs extending generally normal to its integral side, a portion of each of said shoulder tabs extending generally normal to its integral side, said mounting tab portions having a surface most proximate said one end spaced from the surface of said shoulder tab portions most distant from said one end the thickness of said wall and arranged to engage said wall in the vicinity of said aperture, a stud engaging finger integral with each side having an end turned inwardly, each of said ends being formed to contact said stud in at least two spaced regions around the perimeter of a cross section thereof, said respective ends being spaced less than the minimum transverse dimension of said stud in the region along its length registering with said ends, a second pair of opposed stud engaging fingers integral with said intermediate region each having an end formed to contact said stud in at least two spaced regions around the perimeter of a cross section thereof, said contact regions of opposed fingers being spaced less than the minimum transverse dimension of said stud in the region of its length registering with said intermediate region, said second fingers engaging said stud in a region longitudinally displaced along said stud from said point of engagement by said side fingers and having a projection along said stud of their portions adjacent said stud overlap the portions of said side fingers adjacent said stud, said side fingers engaging opposite sides of an intervening stud in quadrature with respect to the stud axis from the region of engagement of opposite sides of said stud by said fingers of said intermediate region.

3. A stud clip according to claim 2 for stably retaining a stud normal to said wall wherein said mounting tabs have a transverse dimension essentially equal to the transverse dimension of the stud to be accommodated, and said tabs have their adjacent faces separated a distance essentially equal to the transverse dimension of the stud whereby said clip when mounted in an aperture which closely fits said mounting tabs closely confines said stud in the region passing through said wall.

4. A stud clip for mounting in registry with an aperture in a wall comprising a pair of opposed sides generally normal to said wall, an intermediate region coupling said sides at one end, a mounting tab extending from each side at a second end adapted to be positioned adjacent said wall, a shoulder tab extending from each side in proximity to said second end, a portion of each of said mounting tabs extending generally normal to its integral side, a portion of each of said shoulder tabs extending generally normal to its integral side, said mounting tab portions having a surface most proximate said one end spaced from the surface of said shoulder tab portions most distant from said one end the thickness of said wall and arranged to engage said wall in the vicinity of said aperture, a stud engaging finger integral with each side having an end turned inwardly and engaging the sides of said stud at spaced portions, said respective ends being spaced less than the minimum transverse dimension of said stud in the region along its length registering with said ends, a pair of opposed fingers integral with said intermediate region each having an end formed with spaced portions adapted to bear against the side of said stud, said side fingers being biased toward an intervening stud in quadrature with respect to the stud axis from the biasing direction of said fingers of said intermediate region said region of contact of said side fingers with said stud being longitudinally displaced along said stud from said region of contact of said fingers of said intermediate region with said stud and the longitudinal projection along said stud of the portions of said side fingers adjacent said stud overlapping the portions of said fingers of said intermediate region adjacent said stud.

5. A stud clip for mounting in registry with an aperture in a wall comprising a pair of opposed sides generally normal to said wall, an intermediate region coupling said sides at one end, means for sustaining said clip with the space between said sides in registry with said aperture at the end of said sides opposite said one end, a stud engaging finger integral with each side having an end turned inwardly toward said opposite side, said respective ends of said stud engaging fingers being spaced less than the minimum transverse dimension of said stud in the region along its length registering with said ends, a pair of opposed fingers integral with said intermediate region each having an end providing a bearing surface for the side of said stud in a region displaced along the length of said stud from the point of engagement by said side fingers, said side fingers engaging opposite sides of an intervening stud in quadrature with respect to the stud axis from the region in which the bearing faces of said fingers of said intermediate region are adapted to engage said stud sides and having longitudinal projections along said stud of the portions adjacent said stud which overlap the portions of said fingers of said intermediate region adapted to engage said stud sides.

References Cited by the Examiner

UNITED STATES PATENTS

| Re. 22,543 | 9/44 | Tinnerman | 85—36 X |
|---|---|---|---|
| 2,157,251 | 5/39 | Tinnerman | 16—125 X |
| 2,282,412 | 5/42 | Wallace | 16—125 X |
| 2,616,142 | 11/52 | Tinnerman | 85—36 X |
| 2,741,938 | 4/56 | Johnson | 85—8.8 |

DONLEY J. STOCKING, *Primary Examiner.*